United States Patent
Krieg et al.

(10) Patent No.: US 8,843,893 B2
(45) Date of Patent: Sep. 23, 2014

(54) UNIFIED FRAMEWORK FOR CONFIGURATION VALIDATION

(75) Inventors: Jan Krieg, Dielheim (DE); Viktor Folmer, Neuhof-Dorfborn (DE); Michelle Braun, Bammental (DE)

(73) Assignee: SAP AG, Walldorf (DE)

( * ) Notice: Subject to any disclaimer, the term of this patent is extended or adjusted under 35 U.S.C. 154(b) by 993 days.

(21) Appl. No.: 12/769,893

(22) Filed: Apr. 29, 2010

(65) Prior Publication Data

US 2011/0271137 A1 Nov. 3, 2011

(51) Int. Cl.
- G06F 9/44 (2006.01)
- G06F 11/30 (2006.01)
- G06F 11/36 (2006.01)

(52) U.S. Cl.
CPC ........ *G06F 11/3051* (2013.01); *G06F 11/3688* (2013.01)
USPC .......................... 717/124; 714/217; 714/47.2

(58) Field of Classification Search
CPC ........................................ G06F 11/36–11/3696
USPC ........ 717/101–178; 714/1–824; 707/600–899
See application file for complete search history.

(56) References Cited

U.S. PATENT DOCUMENTS

| | | | | |
|---|---|---|---|---|
| 5,414,812 A * | 5/1995 | Filip et al. | ...... | 707/694 |
| 5,519,859 A * | 5/1996 | Grace | ...... | 707/690 |
| 5,896,530 A * | 4/1999 | White | ...... | 718/102 |
| 5,930,795 A * | 7/1999 | Chen et al. | ...... | 1/1 |
| 5,987,497 A * | 11/1999 | Allgeier | ...... | 709/201 |
| 6,003,026 A * | 12/1999 | Bonzi | ...... | 1/1 |
| 6,018,742 A * | 1/2000 | Herbert, III | ...... | 1/1 |
| 6,115,710 A * | 9/2000 | White | ...... | 1/1 |
| 6,266,675 B1 * | 7/2001 | Evans et al. | ...... | 1/1 |
| 6,449,624 B1 * | 9/2002 | Hammack et al. | ...... | 1/1 |
| 6,502,102 B1 * | 12/2002 | Haswell et al. | ...... | 1/1 |
| 6,609,128 B1 * | 8/2003 | Underwood | ...... | 707/610 |
| 6,871,344 B2 * | 3/2005 | Grier et al. | ...... | 717/162 |
| 7,437,614 B2 * | 10/2008 | Haswell et al. | ...... | 714/38.13 |
| 7,493,376 B1 * | 2/2009 | Pulpatta et al. | ...... | 709/220 |
| 7,693,731 B1 * | 4/2010 | Weber et al. | ...... | 705/4 |
| 8,239,826 B2 * | 8/2012 | Elenburg et al. | ...... | 717/115 |
| 8,316,023 B2 * | 11/2012 | Cole | ...... | 707/736 |
| 8,522,214 B2 * | 8/2013 | Roth | ...... | 717/126 |
| 2002/0198873 A1 * | 12/2002 | Chu-Carroll | ...... | 707/3 |
| 2003/0229633 A1 * | 12/2003 | Phillips | ...... | 707/4 |
| 2004/0128650 A1 * | 7/2004 | Chamberlain | ...... | 717/124 |

(Continued)

OTHER PUBLICATIONS

Constructing Reusable Testbenches—Alex Wakefield, Synopsys Professional Services, Marlboro, MA, Bassam Jamil Mohd, Synopsys Professional Services, Marlboro, MA—2002.*

(Continued)

*Primary Examiner* — Lewis A Bullock, Jr.
*Assistant Examiner* — Francisco Aponte
(74) *Attorney, Agent, or Firm* — Kenyon & Kenyon LLP (57) ABSTRACT

A modular framework may be provided for configuration checks that enable a developer to classify and describe each check and then subsequently search for checks and integrate them with other checks. Each check may include a dependency on other checks to create a hierarchy. Additionally, multiple checks may be combined. The combination of checks may be used to check configuration of specific processes or systems. Each check unit and business configuration check may contain keywords, descriptions, and documentation to enable the checks to be subsequently searched and reused in different applications. Systems, methods, and articles of manufacture may be provided.

19 Claims, 8 Drawing Sheets

(56) References Cited

U.S. PATENT DOCUMENTS

| | | | |
|---|---|---|---|
| 2005/0097118 A1* | 5/2005 | Slutz | 707/101 |
| 2005/0097515 A1* | 5/2005 | Ribling | 717/124 |
| 2005/0172283 A1* | 8/2005 | Delo | 717/174 |
| 2006/0242173 A1* | 10/2006 | Tsyganskiy et al. | 707/100 |
| 2006/0259509 A1* | 11/2006 | Stolte et al. | 707/102 |
| 2007/0038683 A1* | 2/2007 | Dixon et al. | 707/202 |
| 2007/0074166 A1* | 3/2007 | Overturf et al. | 717/124 |
| 2007/0196015 A1* | 8/2007 | Meunier et al. | 382/190 |
| 2007/0208787 A1* | 9/2007 | Cheng et al. | 707/204 |
| 2007/0239666 A1* | 10/2007 | Garcia | 707/2 |
| 2009/0024677 A1* | 1/2009 | Cheng et al. | 707/204 |
| 2009/0144314 A1* | 6/2009 | Vignet | 707/102 |
| 2009/0254572 A1* | 10/2009 | Redlich et al. | 707/10 |
| 2010/0250497 A1* | 9/2010 | Redlich et al. | 707/661 |
| 2010/0274813 A1* | 10/2010 | Lu et al. | 707/792 |

OTHER PUBLICATIONS

Configuration Management in Terms of Modules—Yi-Jing Lin and Steven P. Reiss—Department of Computer Science, Box 1910, Brown University Providence, RI 02912—1995.*

Configuration Management in Terms of Modules—Yi-Jing Lin and Steven P. Reiss—Department of Computer Science—Brown University—1995.*

Toward a Unified Framework for Version Modeling in Engineering Databases—Randy H. Katz—Computer Science Division, Electrical Engineering and Computer Science Department, University of California—1990.*

Constructing Reusable Testbenches—Alex Wakefield, Synopsys Professional Services, Marlboro, MA Bassam Jamil Mohd, Synopsys Professional Services, Marlboro, MA—2002.*

* cited by examiner

FIG. 1

CHECK_UNIT 110

| Field | Key |
|---|---|
| Check_unit 111 | X |
| Classname 112 | |
| Stop_behavior 113 | |
| Keywords 114 | |
| Classification 115 | |
| Changed_by 116 | |
| Changed_on 117 | |

CHECK_UNIT_TEXT 120

| Field | Key |
|---|---|
| Check_unit 111 | X |
| Language 121 | X |
| Description 122 | |

UNIT_ADD 130

| Field | Key |
|---|---|
| Check_unit 111 | X |
| Pre_check_unit 131 | X |

UNIT_PARAM 140

| Field | Key |
|---|---|
| Check_unit 111 | X |
| Name 141 | |
| Data_element 142 | |
| Options 143 | |
| Interval 144 | |

FIG. 2

| BC_CHECK_TEXT 220 | Key |
|---|---|
| Field | |
| BC_check 211 | X |
| Language 221 | X |
| Description 222 | |

| BC_CHECK 210 | Key |
|---|---|
| Field | |
| BC_check 211 | X |
| Documentation 212 | |
| Changed_by 213 | |
| Changed_on 214 | |

| BC_UNIT 230 | Key |
|---|---|
| Field | |
| BC_check 211 | X |
| Check_unit 111 | X |

UNIFIED FRAMEWORK FOR CONFIGURATION VALIDATION

BACKGROUND

Organizations use different applications and computing systems to manage various business processes and functions. Over time, these applications and computing systems may change to accommodate new or improved processes and functions. To accommodate these changes, new applications and computing systems may be integrated into the organization. Including these new systems and applications can be time consuming and resource intensive, as specialized programmers may be needed to configure and check several thousand or more customizable configuration values to complete the integration with existing systems and applications.

While a computer programmer may be able to write code automating some of these configuration checks, in the past it was difficult to reuse the code in similar situations involving a similar integration because it was difficult to organize and keep track of the code. Because of this, programmers end up rewriting check code for each individual integration. This is not only time consuming and resource intensive, but also delays the integration of new applications into an organization.

Additionally, because of the difficulties in organizing and tracking the code, it was also difficult to include check code of individual contexts into larger configuration check sequences that could be reused in similar integrations to expedite the integration of new applications. Including the larger configuration check sequences could expedite the checking process by reducing the remaining configuration values to be checked and reducing integration time.

There is a need for a modular framework for configuration checks that allows checks to be combined and reused for different applications.

DETAILED DESCRIPTION

In an embodiment of the invention, a modular framework may be provided for configuration checks that enable a developer to classify and describe each check and then subsequently search for checks and integrate them with other checks. Individual checks of a configuration in an application may be classified as a check unit. Each check unit may include a dependency on other check units to create a check hierarchy. Additionally, multiple check units may be combined in a business configuration check, which may be created to check configuration values of specific processes or functionality in an application. Each check unit and business configuration check may contain keywords, descriptions, and documentation to enable the checks to be subsequently searched and reused in different applications.

An exemplary method for generating a check of configuration values in a system may include the steps of generating an identifier for a first check unit in a check unit field of a first table, linking a searchable keyword in the first table for the first check unit to the identifier, linking an identifier of a second check unit to the first check unit identifier in a second table to indicate that the second check unit is executed before the first check unit, and linking an identifier of the configuration and a parameter as well as a respective data element of the configuration to the first check unit identifier in a third table. A check may also be generated by combining several check units through steps including searching for check units associated with a matching keyword, including an identifier of a check unit having the matching keyword in the check, where the scope of the check is first limited by a parameter associated with a check unit identified in a second table as preceding the included check unit before limiting the scope of the check by a parameter associated with the included check unit.

Figure 1:
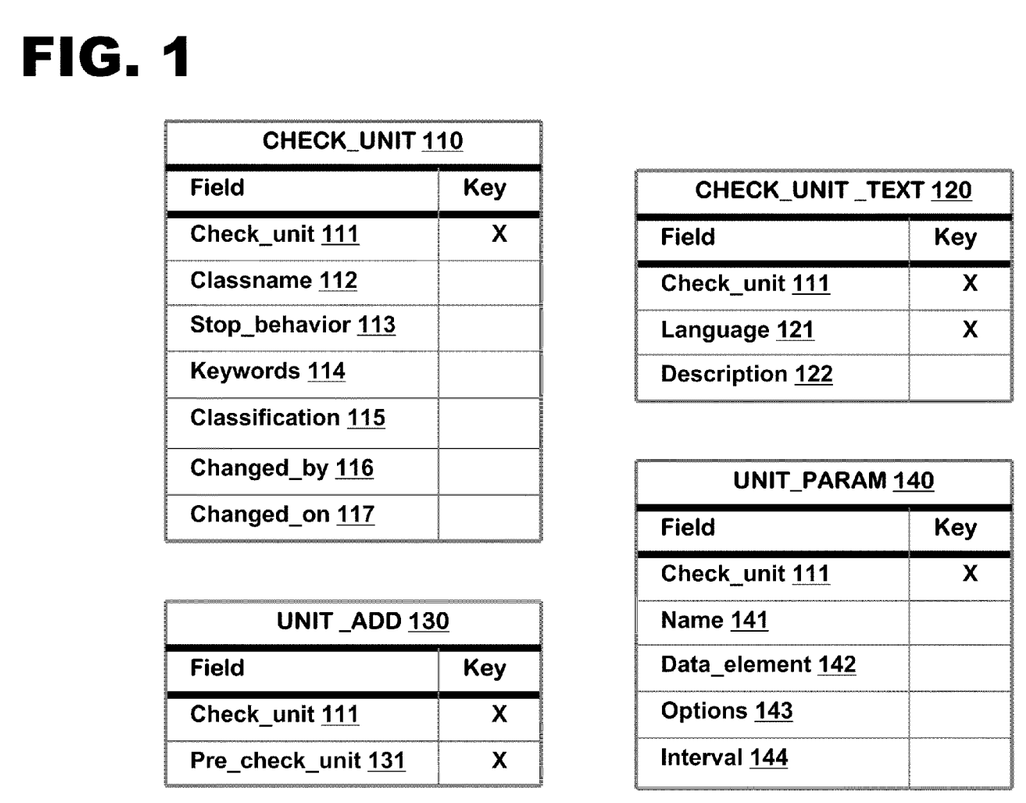
FIG. 1 shows exemplary tables associated with individual check units in a database of an embodiment.

FIG. 1 shows exemplary tables associated with individual check units in a database of an embodiment. Each check unit may contain information for verifying a configuration setting during the integration process. The system settings that control the behavior of a system may make up the configuration of the system. A Check_Unit table 110 may contain a check_unit field 111 which may store a unique identifier of each check unit and may also be a primary key for the table 110. The Check_Unit table 110 may also contain a classname 112, stop_behavior 113, keywords 114, classification 115, changed_by 116, and changed_on 117 fields.

The classname field 112 may include an identifier of an object-oriented class that initiates the verification process. The stop_behavior field 113 may include a condition that, if it occurs, causes the check process to cease. A parameter may be an input field that may be used to limit the scope of a check. For example, if the user supplies a particular company code as a parameter, the checks that are performed may be limited to the particular company code. If no company code is supplied, the checks that are performed may include all company codes. The keywords field 114 may include one or more keywords describing the check so that the check can be retrieved and used in future application integrations. The classification field 115 may be used to classify the check based on an application, business process, or function related to the check so that the check can be retrieved and used in future application integrations. The changed_by 116 and changed_on 117 fields may identify a user making changes to a check and the time the user made the changes.

The Check_Unit_Text table 120 may contain the check_unit field 111 linking the fields to the Check_Unit table 110. The Check_Unit_Text table 120 may also contain a language 121 and description 122 fields. The language field 121 may identify a language of text in the description field 122. The description field 122 may contain a description of the functionality offered by the check in the language of the language field 121. The language 121 and check_unit 111 fields may be primary keys for the Check_Unit_Text table 120.

The Unit_Add table 130 may contain the check_unit 111 and pre_check_unit 131 fields. The check_unit field 111 in the Unit_Add table 130 may link the fields in the Unit_Add table 130 to the Check_Unit table 110. The pre_check_unit field 131 may identify a dependent check upon which the check in check_unit 111 depends. The pre_check_unit field 131 may be used to create an embedded hierarchy of checks. In an embodiment, a check identified in the pre_check_unit field 131 may be executed before the check identified in the check_unit field 111. The check_unit 111 and pre_check_unit 131 fields may be primary keys for the Unit_Add table 130.

The Unit_Param table 140 may contain the check_unit 111, name 141, data_element 142, options 143, and interval 144 fields. The check_unit field 111 in the Unit_Param table 140 may link the fields in the Unit_Param table 130 to the Check_Unit table 110. The name field 141 may identify a parameter that may limit the scope of checks to specific values of the parameter that may be entered by a user. The data_element field 142 may identify a type of data, such as text, integer, yes/no, and others, that is supported by the parameter and may include a description of the parameter. The options field 143 may be used to display options selectable by a user during runtime of the check. For example, a field for entering a parameter value may be displayed during runtime and the resulting value entered by the user may be compared to the parameter value in the application when performing the check to limit the scope of the check. The interval field 144 may be used to limit the display of the options 143, to a specific interval.

Figure 2:
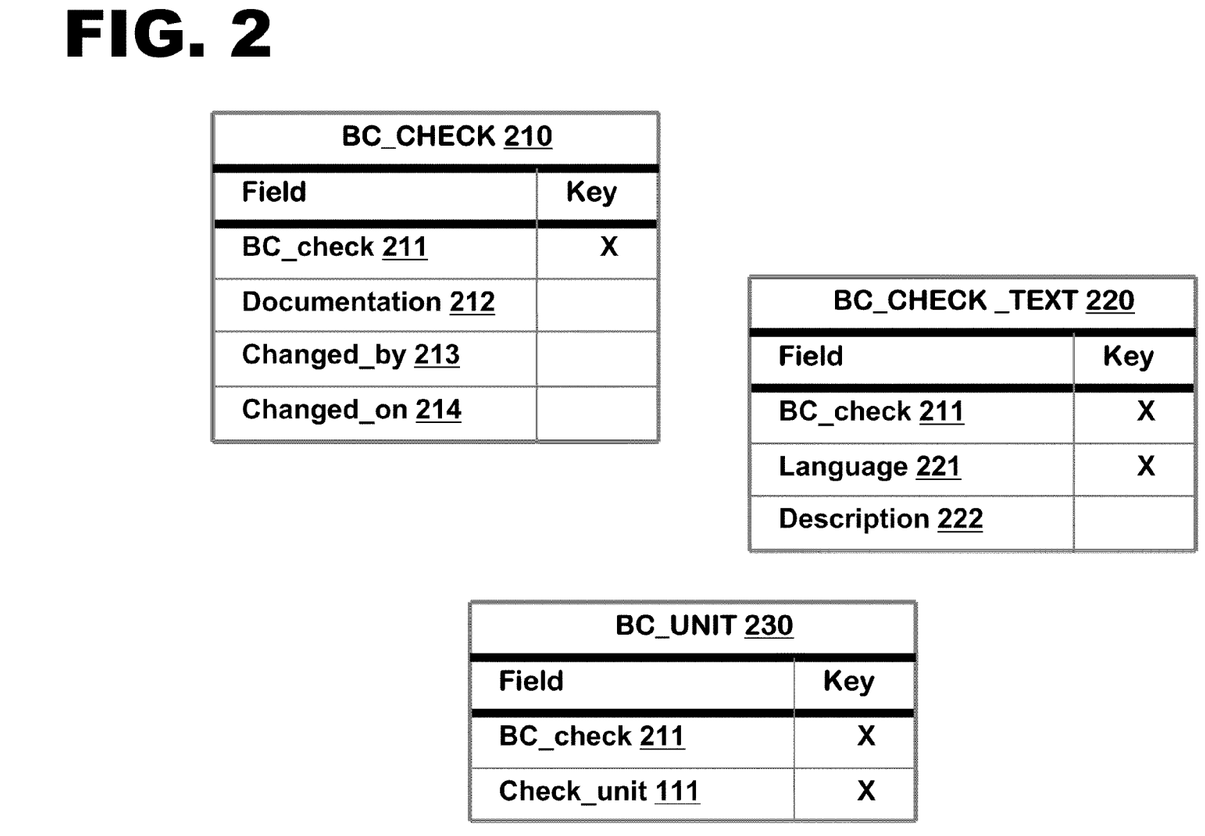
FIG. 2 shows exemplary tables associated with business configuration checks in a database of an embodiment.

FIG. 2 shows exemplary tables associated with business configuration checks in a database of an embodiment. A business configuration (BC) check may be made up of several individual check units, each of which may check individual configuration values of the application during application integration. The individual check units may be selected so that the business configuration check, as a whole, checks configuration values relating to a specific business process. The business configuration check may store information identifying the specific business process so that the business configuration check can be retrieved and reused in other application integrations using the same business process.

The BC_Check table 210 may contain a BC_check field 211 which may store a unique identifier of each business configuration check and may also be a primary key for the table 210. The BC_Check table 210 may also contain documentation 212, changed_by 213, and changed_on 214 fields.

The documentation field 212 may contain documentation providing in-depth explanation of the business process and/or functionality covered by a business configuration check so that users can decide whether the check offers the same features needed in a future application integration. The changed_by 213 and changed_on 214 fields may identify a user making changes to a check and the time the user made the changes.

The BC_Check_Text table 220 may contain the BC_check field 211 linking the fields to the BC_Check table 210. The BC_Check_Text table 220 may also contain a language 221 and description 222 fields. The language field 221 may identify a language of text in the description field 222. The description field 222 may contain a brief description of the functionality offered by the check in the language of the language field 221. The language 221 and BC_check 211 fields may be primary keys for the BC_Check_Text table 220.

The BC_Unit table 230 may contain the BC_check 211 and check_unit 111 fields. The BC_check field 211 in the BC_Unit table 230 may link the fields in the BC_Unit table 230 to the BC_Check table 210. The check_unit field 111 may identify an individual check associated with the business check in the BC_check field 211. Multiple individual checks implemented as check units may be associated with a business configuration check.

Figure 3:
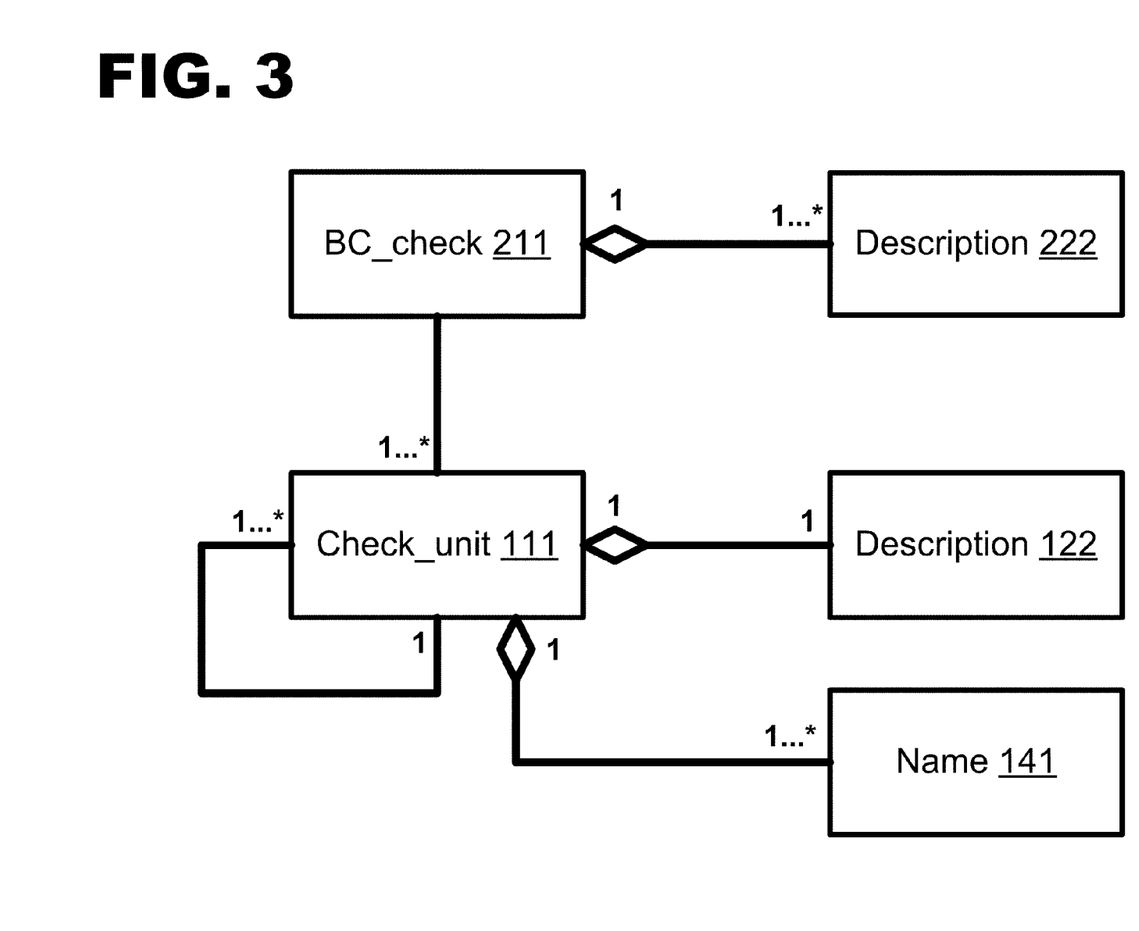
FIG. 3 shows an exemplary relationship between a business configuration check and individual check units in an embodiment.

FIG. 3 shows an exemplary relationship between a business configuration check (BC_check) and individual check units (check_unit) in an embodiment. Each BC_check 211 may have one or more descriptions 222 associated with it. Each description 222 may describe the business process and/or functionality covered by the BC_check 211, which may be included in the form of end user documentation created by the developer of the BC_check 211. The description 222 may include instructions of how to use the BC_check 211. The description may also be included in one or more languages 221.

Each BC_check 211 may specify one or more check_units 111 containing individual checks that may be performed at runtime. Each check_unit 111 may include a description 122, which may include a technical description of the functionality offered by the check_unit 111. Each check_unit 111 may include one or more parameter names 141 to limit the scope of checks performed at runtime to particular parameters of interest. Each check_unit 111 may also refer to another check unit in the pre_check_unit field 131 that is to be processed at runtime before the current check_unit 111. The other check unit may also have a third check unit identified in its pre_check_unit field 131, and so on, so there may be many different check units that are processed in a hierarchical order at runtime.

Figure 4:
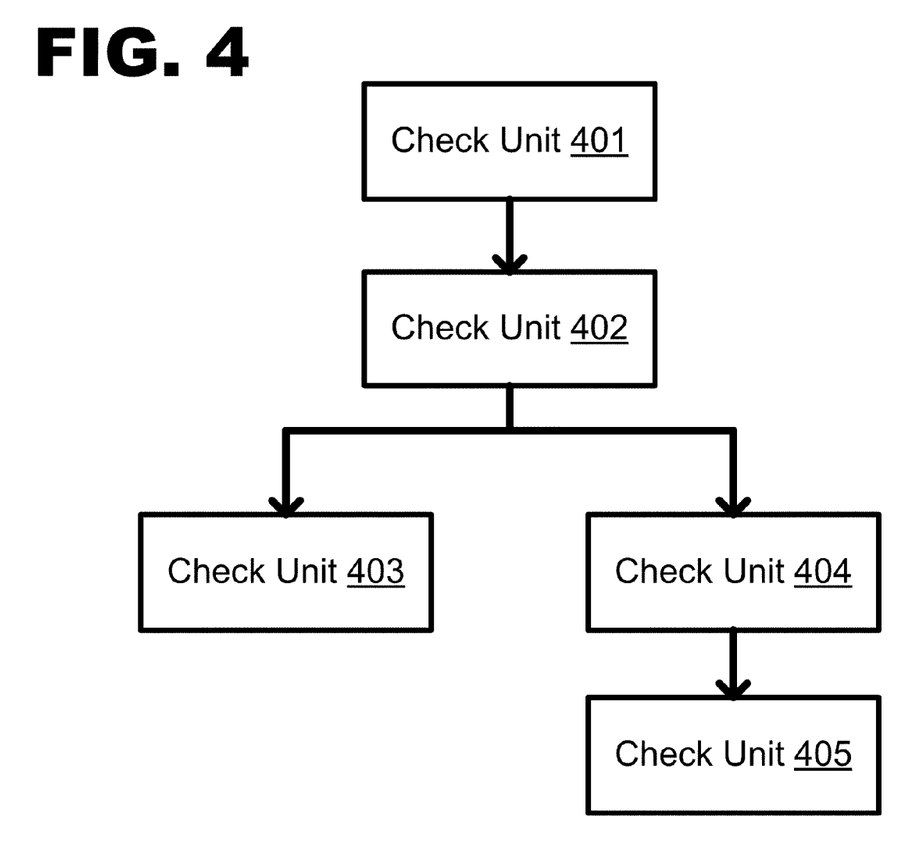
FIG. 4 shows an exemplary hierarchy of check units in an embodiment.

FIG. 4 shows an exemplary hierarchy of check units in an embodiment. A first check unit 401 may refer to check unit 402 in its pre_check_unit field 131. Check unit 402 may refer to check units 403 and 404 in its pre_check_unit field 131. Check unit 404 may refer to check unit 405 in its pre_check_unit field 131. At runtime, the check units lowest in the hierarchy may be processed first, so the configuration value to be checked in check unit 405 may be checked first, followed by those in check units 404 and 403, followed by check unit 402, and then lastly check unit 401.

Figure 5:
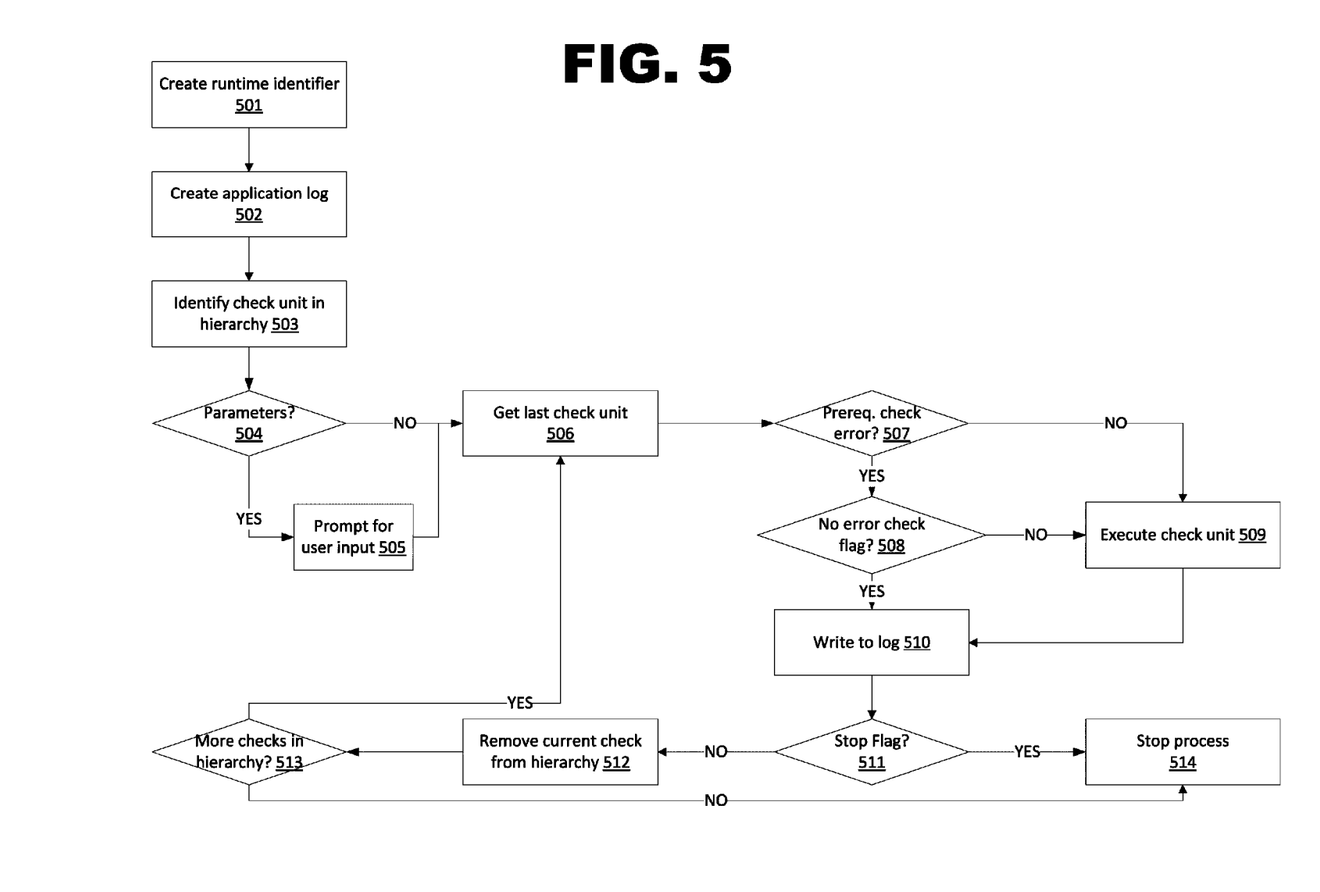
FIG. 5 shows an exemplary runtime process for executing checks in an embodiment.

FIG. 5 shows an exemplary runtime process for executing checks in an embodiment. In box 501, a unique identifier may be created to distinguish the start of this runtime check from other checks at other times. In box 502, an application log may be created. The application log may store results of executing a check in each check unit. The application log may also store errors, successes, records of checks performed, discrepancies, or other data specified by a user. In an embodiment, the application log may store data specified in options field 143 at an interval specified in field 144.

In box 503, the check units included within the hierarchy of the runtime check may be identified. These check units may include, for example, all check units within a business configuration check. In addition to identifying check units included in the hierarchy, a hierarchical order in which the identified check units are to be executed may also be identified.

In box 504, the identified check units may be searched to determine whether any of the check units require parameter values to limit the scope of checks when checks are executed. Parameters may be used to limit the scope of checks in order to complete checks in an efficient manner. Thus, if a particular parameter such as a particular company code is used, checks will only be executed for that company code. If a company code is not provided, checks may be executed for all company codes.

If any of the identified check units have parameters for which a user may supply parameter values at runtime to limit the scope of checks, then in box 505 the user may be prompted to input parameter values. Once the user has supplied the input parameter values, the last check unit lowest in the hierarchy may be retrieved for analysis in box 506. The last check unit in the hierarchy may also be retrieved for analysis in box 506, if none of the identified check units have the aforementioned parameters.

In box 507, a prerequisite check associated with the retrieved check in box 506 may be executed. If the prerequisite check is able to be successfully executed without causing an error, in box 509 the actual check associated with the check unit retrieved in box 506 may be executed. In some embodiments, a result of performing the actual check associated with the check unit retrieved in box 506 may be recorded in box 510 in the application log created in box 502.

However, if the prerequisite check is not able to be successfully executed and causes an error, a flag field associated with the retrieved check in box 506 may be examined in box 508. If the flag field is set to abort a check if the prerequisite check is not successfully executed, then the actual check may not be executed and a result may be recorded in some embodiments in the application log in box 510.

In box 511, if a condition in the stop_behavior field 113 associated with the check unit retrieved in box 506 is satisfied, the check process may be stopped in box 514. Otherwise, in box 512, the current check unit retrieved in box 506 may be temporarily removed from the check unit hierarchy. The hierarchy may then be reexamined in box 513 to determine whether there are any remaining checks left in the hierarchy. If there are remaining checks, the process may continue in box 506 using the newest last check unit in the hierarchy after the previous last check unit was removed in box 512. If there are no remaining checks, the check process may be stopped in box 514.

Figure 6:
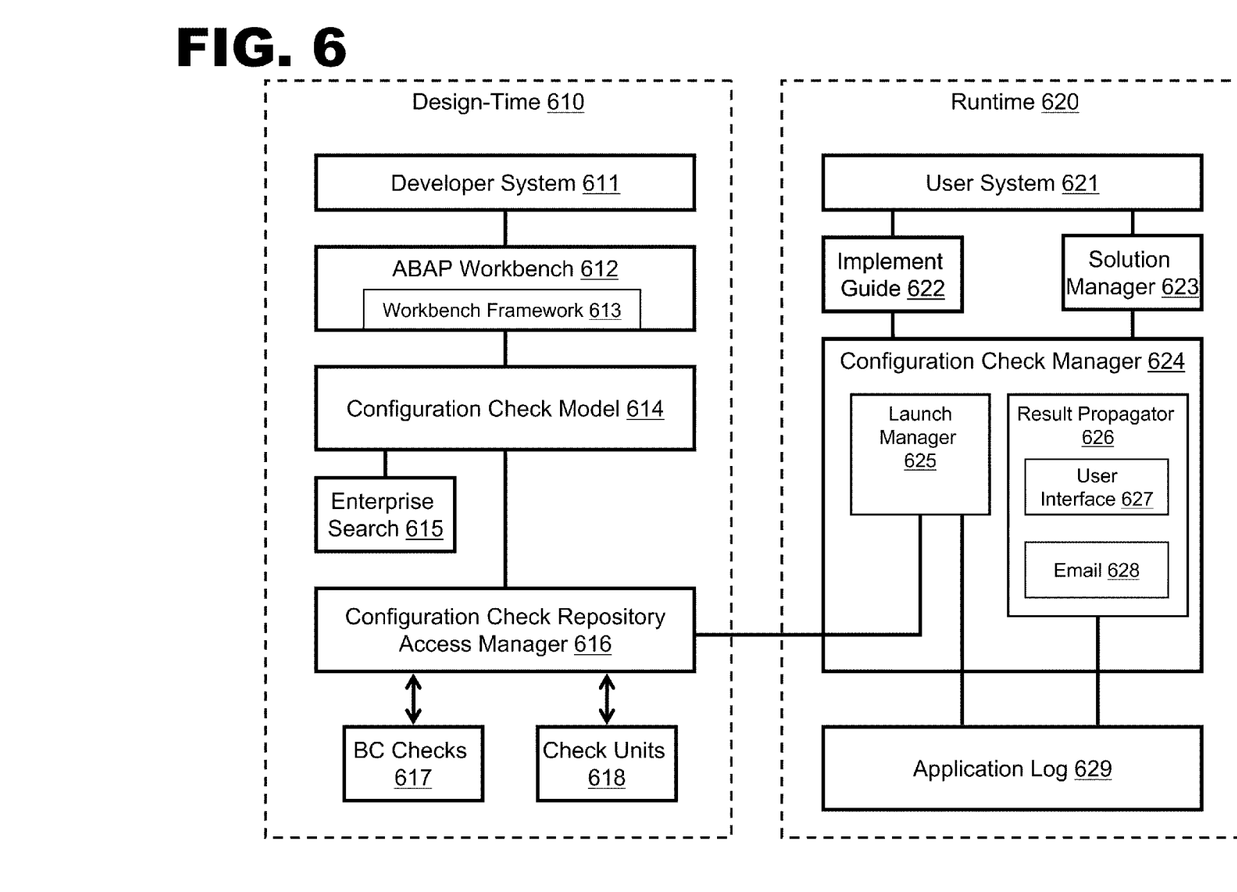
FIG. 6 shows a design-time and runtime framework for implementing an embodiment of the invention.

FIG. 6 shows a design-time and runtime framework for implementing an embodiment of the invention. The design-time framework 610 may include a framework for software developers to create new check units and business configuration checks. The runtime framework 620 may include a framework for users to execute the check units and business configuration checks when integrating a new or modified computing system into an organization.

In the exemplary design-time framework 610, a check developer may use a developer computing system 611 to interface with an ABAP Workbench 612. The ABAP Workbench 612 may include a workbench integration framework 613 that can be used to directly interface with the configuration check model 614 discussed and shown in FIGS. 1 to 5. The configuration check model 614 may interface with an enterprise search application 615. The enterprise search application 615 may provide an interface for the developer to enter search terms for specific checks. The enterprise search application 615 may then formulate a query in a format recognized by the configuration check model 614, to search fields such as the keyword 114, classification 115, description 122 and 222, language 121 and 221, and documentation 212 fields for either check units or business configuration checks matching the search terms. The search of the actual data fields may be conducted through the configuration check repository access manager 616 which may conduct the data field search of business configuration checks 617 and check units 618 to identify preexisting checks that may potentially be reused by the developer as part of new checks. If a developer creates a new check through the model 614, the new check may be stored in the repository by the access manager 616.

In the exemplary runtime framework 620, a user seeking to integrate an application into an organization may use a user system 621 to execute pertinent checks created by the developer. Implementation guide 622 and solution manager 623 may include tools for an end-user customer to launch business configuration checks. The implementation guide 622 and solution manager 623 may present the user with a step-by-step walkthrough for launching business configuration checks.

The solution manager 623 may assist in suggesting particular business configuration checks that should be executed during the application integration check process. The solution manager 623 may interface with the check manager 624 to communicate selected checks to the check manager 624.

Once the selected checks have been identified, the launch manager 625 may interface with the repository access manager 616 to retrieve and execute the identified business configuration checks 617 and/or check units 618. The check manager 624 may also include a result propagator 626. The result propagator 626 may take a result of executing a check, such as errors, successes, or other results and present them in a particular format depending on customizable conditions. The results propagator 626 may include a configuration check user interface module 627, an email module 628, and other communications modules, such as an instant messaging module.

The configuration check user interface module 627 may provide a user interface for display results of executing a check on a screen to the user. The user interface module 627 may be customized to display only limited events resulting from executing specific checks. For example, the interface may be customized to display only errors in the stop_behavior field 113 of a particular group of checks or it may be customized to display all errors. The interface 627 may also be customized to organize the results displayed by category or field, so that the results of each check may be group together, or all the errors and successes may be grouped together and so on. The interface 627 may also be customized to allow searching, filtering, and reorganizing of reported results.

The email module 628 may be configured to email certain results to certain users. Both the launch manager 625 and the result propagator 626 may be configured to interact with the application log 629. During this interaction, check execution results may be stored in the application log 629, and the results stored in the application log 629 may be used by the result propagator 626 and its respective modules 627 and 628.

Figure 7:
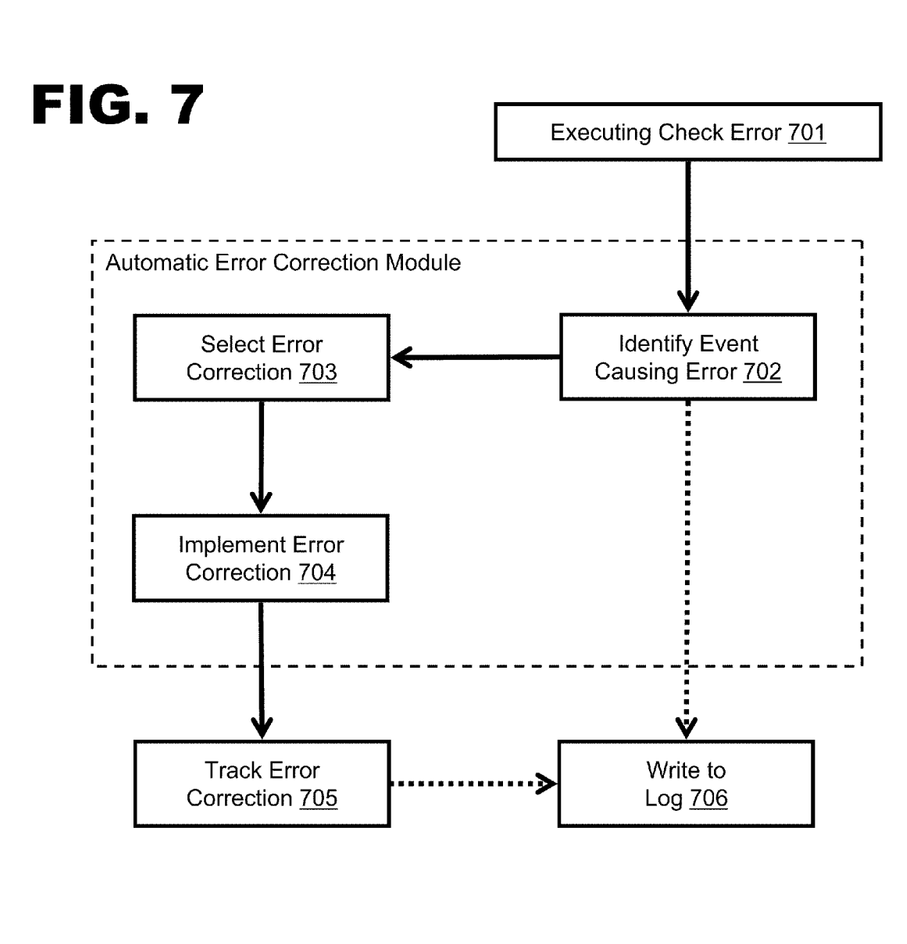
FIG. 7 shows an exemplary structure of a module for automatically correcting errors when executing checks.

FIG. 7 shows an exemplary structure of a module for automatically correcting errors when executing checks. In box 701, an error may occur during or after executing a check during the check process. The error may be related to a check unit or a business configuration check.

In box 702, an event causing the error may be identified. For example, if a configuration value mismatch error occurs because a retrieved system configuration setting value does not match a value specified in the check, the event causing the error may be identified as a value mismatch. If an error occurs because a data source has changed so the configuration value can not be retrieved, the event causing the error may be identified as a data source mismatch. In some situations, the identified event may be recorded in the application log in box 706.

In box 703, an error correction 703 may be selected from a lookup table matching the error correction to the error, the check causing the error, and the identified event and/or the check unit causing the error. The error correction could be a formula, value, variable, complex method, function, program, macro, or script, which, when implemented, corrects the error. Thus, for example, if the error is a configuration value mismatch, the error correction could be a new configuration value that resolves the mismatch.

If there is only one identified error correction 703, then that error correction 703 may be automatically implemented in box 704. If there are multiple possible identified error corrections 703, then the user may be prompted to select a desired correction, or the process may automatically select a most likely desired correction 703. The most likely correction 703 may be automatically determined by comparing likelihoods that each of the possible identified error corrections 703 will correct the problem. The likelihoods may be provided in the lookup table. The most likely correction 703 may be implemented in box 704 when its likelihood exceeds an absolute threshold or a threshold relative to that of the other identified corrections 703.

In box 705, each of the error corrections implemented in box 704 may be recorded so that each implemented correction can be undone if a user later decides to override the automatic correction. In some situations, each of the recorded error corrections in box 705 may also be designated in the application log in box 706.

Figure 8:
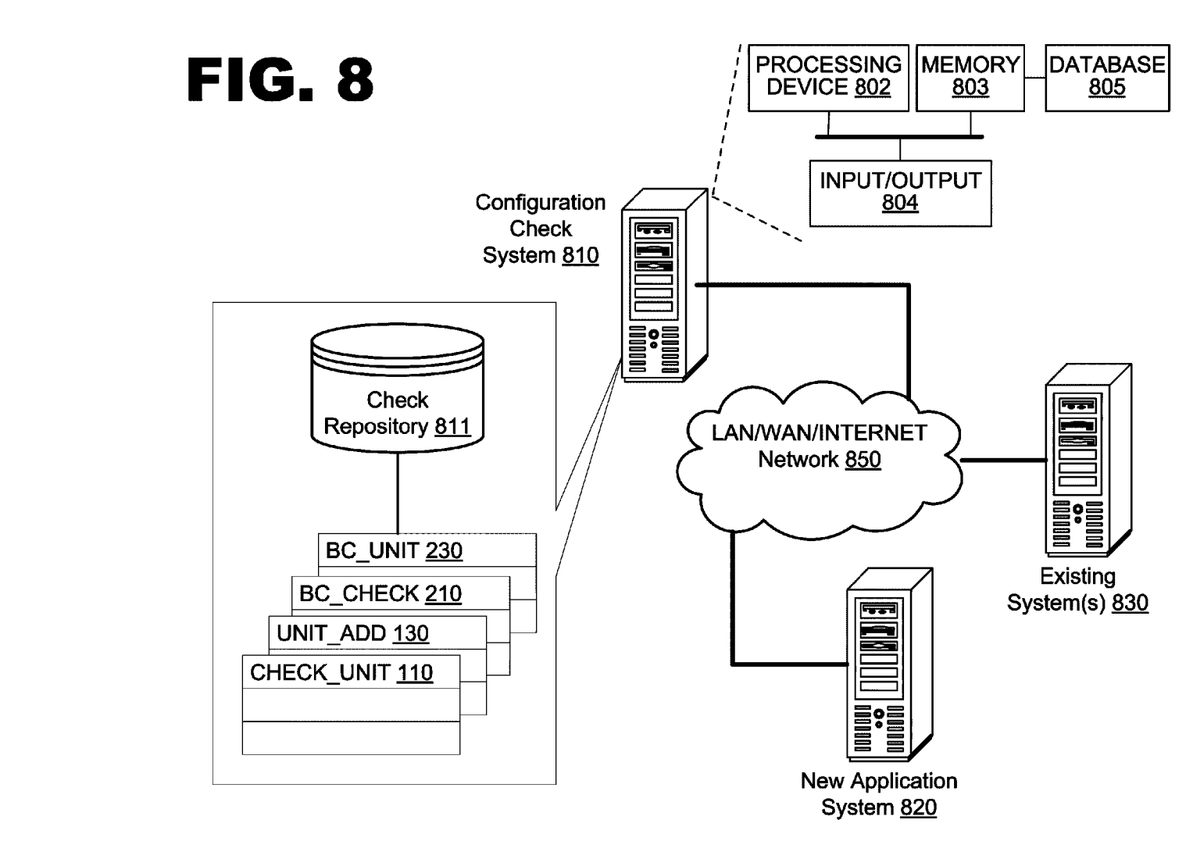
FIG. 8 shows an embodiment of a configuration check system coupled to a new application system and existing systems of an organization through a network.

FIG. 8 shows an embodiment of a configuration check system 810 coupled to a new application system 820 and existing system(s) 830 of an organization through a network 850. In an embodiment, the configuration check system 810 may be consolidated or integrated into one or more computer systems, such as the new application system 820 or existing systems 830, though in other embodiments, some or all of these systems may be separate, independent computing systems.

The configuration check system 810 may include or be connected to a repository 811. The repository 811 may store check unit data and business configuration check data in tables 110, 120, 130, 140, 210, 220, and 230. The configuration check system 810, may also include the configuration check model 614, repository access manager 615, and configuration check manager 624.

Each of the systems in FIG. 8 may contain a processing device 802, memory 803 containing a database 805, and an input/output interface 804, all of which may be interconnected via a system bus. In various embodiments, each of the systems 810, 820, and 830 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 803 may contain different components for retrieving, presenting, changing, and saving data. Memory 803 may include a variety of memory devices, for example, Dynamic Random Access Memory (DRAM), Static RAM (SRAM), flash memory, cache memory, and other memory devices. Additionally, for example, memory 803 and processing device(s) 802 may be distributed across several different computers that collectively comprise a system.

Processing device 802 may perform computation and control functions of a system and comprises a suitable central processing unit (CPU). Processing device 802 may comprise a single integrated circuit, such as a microprocessing device, or may comprise any suitable number of integrated circuit devices and/or circuit boards working in cooperation to accomplish the functions of a processing device. Processing device 802 may execute computer programs, such as object-oriented computer programs, within memory 803.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, hard disks, floppy disks, or CD ROM; the Internet or other propagation medium; or other forms of RAM or ROM.

We claim:

1. A method for generating a check of a configuration in a system, the method comprising:

generating a first identifier for a first check unit in a check unit field of a first table;

generating a second identifier for a second check unit;

linking through a processing device a searchable keyword in the first table for the first check unit to the first identifier;

linking the second identifier to the first identifier in a second table to indicate that the second check unit is to be executed before the first check unit;

linking an identifier of a parameter to the first check unit identifier in a third table, the parameter limiting a scope of subsequently executed checks;

to generate the check, searching for a matching keyword through the processing device and including an identifier of a check unit having the matching keyword in the check, where the check first verifies a configuration value in the system associated with a check unit listed in the second table and then verifies a configuration value associated with the included check unit after limiting the scope of the check to the respective parameters in the third table;

identifying an event causing an error when executing the check based on at least one of: (a) a configuration value not being retrievable and (b) a retrieved system configuration setting value not matching a value specified in the check;

selecting and implementing a correction from a lookup table matching the correction to at least one of: the error, the check causing the error, the identified event, and the check unit causing the error; wherein each correction has an associated likelihood of correcting the error and the correction is selected based on the likelihood of the correction exceeding at least one of: an absolute threshold and a threshold relative to likelihoods of other corrections; and tracking the implemented correction.

2. The method of claim 1, further comprising linking a stop behavior field to every check unit that has prerequisite checks, the stop behavior field identifying a condition on which to abort execution of the check.

3. The method of claim 1, further comprising linking a language field and a description to a check unit identifier in a fourth table, the language field specifying a language of the description of the check unit, wherein upon selection of a preferred language, the description of at least one check unit is presented in the preferred language.

4. The method of claim 3, further comprising searching the description of a plurality of check units in the preferred language to identify the matching keyword.

5. The method of claim 1, further comprising choosing a select-option at runtime of the check from an options field included in the third table.

6. The method of claim 5, wherein the select-option is limited to an interval specified in an interval field included in the third table.

7. The method of claim 1, further comprising generating a business configuration check made up of a plurality of checks.

8. The method of claim 7, further comprising linking an identifier of the business configuration check to documentation in a fourth table, the documentation documenting functionality provided by the business configuration check.

9. The method of claim 7, further comprising linking an identifier of the business configuration check to an identifier of each of the check units included in the business configuration check in a fourth table.

10. The method of claim 7, further comprising linking a language field and a description to a business configuration check identifier in a fourth table, the language field specifying a language of the description of the business configuration check, wherein upon selection of a preferred language, the description of at least one business configuration check is presented in the preferred language.

11. The method of claim 1, further comprising including an event during the check generation in an application log.

12. The method of claim 1, wherein the error is identified as a value mismatch responsive to a determination that the retrieved system configuration setting value does not match the value specified in the check.

13. The method of claim 1, wherein the correction is selected and implemented automatically through the processing device.

14. The method of claim 1, wherein the error is identified as a data mismatch responsive to a determination that the configuration value is not retrievable due to a change of a data source.

15. The method of claim 13, further comprising subsequently undoing the automatically implemented correction from the tracking.

16. The method of claim 1, wherein an error causing event or a tracked correction is recorded in an application log.

17. The method of claim 1, wherein:
each of the tables includes a classification field that classifies the check as at least one of: an application, a business process, and a function related to the check;
and the classification is used to retrieve the check.

18. A system for generating a check of a configuration in a system comprising:
a processing device including a processor;
a configuration check repository access manager linked to the processing device, the access manager managing access to a first, second, and third tables, the first table linking a searchable keyword for a first check unit to a first generated identifier of the first check unit, the second table linking a second generated identifier of a second check unit to the first check unit identifier to indicate that the second check unit is to be executed before the first check unit, the third table linking an identifier of a parameter to the first check unit identifier, the parameter limiting the scope of the check;
a configuration check model linked to the processing device, wherein the configuration check model contains instructions for searching a table for a matching keyword through the processing device and include an identifier of a check unit having the matching keyword in the check; and
a configuration check manager to, at runtime for a selected check:
process the check units associated with the check according to an order specified in the second table for each check unit and limit the scope of the check units according to the parameters in the third table;
identify an event causing an error when executing the check based on at least one of (a) a configuration value not being retrievable and (b) a retrieved system configuration setting value not matching a value specified in the check;
select and implement a correction from a lookup table matching the correction to at least one of: the error, the check causing the error, the identified event, and the check unit causing the error; wherein each correction has an associated likelihood of correcting the error and the correction is selected based on the likelihood of the correction exceeding at least one of: an absolute threshold and a threshold relative to likelihoods of other corrections; and
track the implemented correction.

19. A non-transitory computer-readable medium on which there are stored instructions that, when executed by a processing device, cause the processing device to perform a method, the method comprising:
generating a first identifier for a first check unit in a check unit field of a first table;
generating a second identifier for a second check unit;
linking through a processing device a searchable keyword in the first table for the first check unit to the first identifier;
linking the second identifier to the first identifier in a second table to indicate that the second check unit is to be executed before the first check unit; linking an identifier of a parameter to the first check unit identifier in a third table, the parameter limiting a scope of subsequently executed checks; and
to generate the check, searching for a matching keyword through the processing device and including an identifier of a check unit having the matching keyword in the check, where the check first verifies a configuration value in the system associated with a check unit listed in the second table and then verifies a configuration value associated with the included check unit after limiting the scope of the check to the respective parameters in the third table;
identifying an event causing an error when executing the check based on at least one of: (a) a configuration value not being retrievable and (b) a retrieved system configuration setting value not matching a value specified in the check;
selecting and implementing a correction from a lookup table matching the correction to at least one of: the error, the check causing the error, the identified event, and the check unit causing the error; wherein each correction has an associated likelihood of correcting the error and the correction is selected based on the likelihood of the correction exceeding at least one of: an absolute threshold and a threshold relative to likelihoods of other corrections; and
tracking the implemented correction.

* * * * *